US007658882B2

(12) United States Patent
Minganti

(10) Patent No.: US 7,658,882 B2
(45) Date of Patent: Feb. 9, 2010

(54) FORMING CONTAINERS

(75) Inventor: Gianni Minganti, Imola (IT)

(73) Assignee: Sacmi Cooperativa Meccanici Imola Societa' Cooperativa, Imola (BO) (IT)

( * ) Notice: Subject to any disclaimer, the term of this patent is extended or adjusted under 35 U.S.C. 154(b) by 813 days.

(21) Appl. No.: 11/057,375

(22) Filed: Feb. 15, 2005

(65) Prior Publication Data
US 2005/0189681 A1 Sep. 1, 2005

(30) Foreign Application Priority Data
Feb. 16, 2004 (IT) .......................... MO2004A0034

(51) Int. Cl.
B29C 49/02 (2006.01)
B29C 49/12 (2006.01)
B29C 49/36 (2006.01)
(52) U.S. Cl. ........................ 264/532; 264/322; 425/528; 425/529; 425/540
(58) Field of Classification Search ................. 264/322, 264/532, 357; 425/528, 529, 533, 540
See application file for complete search history.

(56) References Cited

U.S. PATENT DOCUMENTS

| | | | |
|---|---|---|---|
| 688,924 A * | 12/1901 | Blair et al ...................... | 65/79 |
| 2,781,552 A | 2/1957 | Gray | |
| 2,854,694 A | 10/1958 | Mumford | |
| 3,002,225 A * | 10/1961 | Goller ........................ | 425/526 |
| 3,029,468 A * | 4/1962 | Valyi ........................... | 425/525 |
| 3,184,524 A | 5/1965 | Whiteford | |
| 3,305,158 A | 2/1967 | Whiteford | |
| 3,337,910 A * | 8/1967 | West ........................... | 425/181 |
| 3,461,503 A * | 8/1969 | Dockery .................... | 425/529 |
| 3,546,746 A | 12/1970 | Johnson | |
| 3,602,946 A * | 9/1971 | Curetti et al. ................ | 425/185 |
| 3,634,182 A * | 1/1972 | Biglin et al. ................. | 428/156 |

(Continued)

FOREIGN PATENT DOCUMENTS

DE 14 79 583 9/1969

(Continued)

OTHER PUBLICATIONS

International Search Report for PCT/EP2005/001204, Apr. 20, 2005, 3 pages.

*Primary Examiner*—Robert B Davis
(74) *Attorney, Agent, or Firm*—Nixon & Vanderhye P.C.

(57) ABSTRACT

A method comprises forming a preform of plastic material, expanding said preform to obtain a container, said forming comprising compression-forming said preform in that mould arrangement wherein said expanding occurs; a method comprises expanding a preform in a mould arrangement to obtain a container, before said expanding it being provided to form a dose of plastic material in a paste state in said mould arrangement to obtain said preform; an apparatus comprises a forming mould arrangement, a punch device for expanding a preform in said mould arrangement, an abutting device cooperating with said punch device, said punch device and said abutting device identifying a configuration in which said punch device and said abutting device cooperate to define a forming unit for compression-forming a semifinished product of plastic material to obtain said preform and a further configuration in which said punch device and said abutting device cooperate to define an expansion unit of said preform to obtain a container.

30 Claims, 13 Drawing Sheets

U.S. PATENT DOCUMENTS

| | | | |
|---|---|---|---|
| 3,661,489 A * | 5/1972 | Moore | 425/236 |
| 3,757,718 A * | 9/1973 | Johnson | 72/57 |
| 4,265,852 A * | 5/1981 | Sauer | 264/512 |
| 4,327,052 A * | 4/1982 | Sauer | 264/512 |
| 4,519,977 A | 5/1985 | Kawaguchi et al. | |
| 4,563,325 A * | 1/1986 | Coffman | 264/550 |
| 2003/0094726 A1 | 5/2003 | Morozumi | |
| 2007/0290415 A1 * | 12/2007 | Suenaga et al. | 264/532 |

FOREIGN PATENT DOCUMENTS

| | | |
|---|---|---|
| EP | 1 099 527 | 5/2001 |
| JP | 2003159743 | 6/2003 |
| WO | WO 01/34362 | 5/2001 |
| WO | WO 2005/077642 | 8/2005 |

* cited by examiner

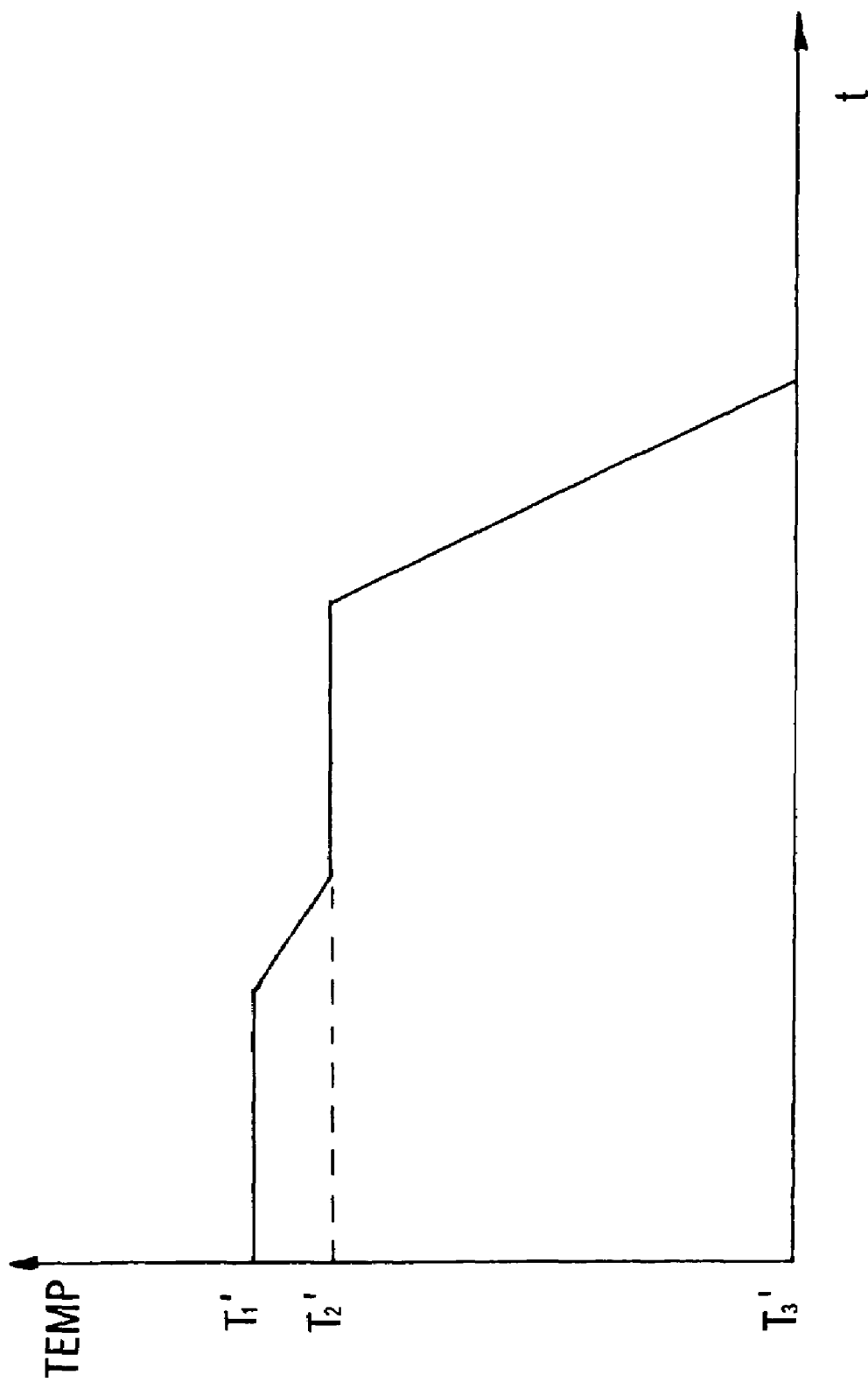

FORMING CONTAINERS

The invention relates to forming containers from a semifinished product, for example in plastic material such as a pad formed by injection, or a disc or a dose of plastic material in a paste state.

The state of the art comprises systems for thermoforming containers from flat film in single-layered or multilayered plastic material.

Systems are furthermore known for forming containers that provide for expanding, by means of pressurised air, in a forming mould, a preform of a container obtained by injection. JP-2001 000362600, publication JP-2003 159743, is furthermore known that discloses a system for forming containers comprising in sequence:

positioning a semifinished disc-shaped product in plastic material near an opening of a forming mould for forming containers;

expanding said semifinished product in said forming mould by means of a punch inserted into said mould through said opening.

Before being positioned near the opening, the semifinished product is formed in a suitable forming mould for forming the semifinished product, in which a dose of thermoformable plastic material is placed between a punch and a die that can be moved up to and be removed from one another to give the dose the desired shape.

JP-2001 000362600 therefore has the drawback of using two types of mould, i.e. a mould for forming the semifinished product and a mould for forming containers.

Furthermore, JP-2001 000362600 involves subjecting the plastic material to a complete heating and cooling cycle to form the semifinished product and to a further heating and cooling cycle to form the container.

U.S. Pat. No. 6,264,050 discloses a forming system in which starting from a sheet material, precursors of containers are formed that are then separated from the sheet material and expanded in a forming mould by compressed air to obtain formed containers.

U.S. Pat. No. 6,264,050 has the drawback of using different apparatuses to form the precursors and to expand the latter to obtain containers.

An object of the invention is to improve the known systems to obtain containers.

A further object is to make the manufacturing systems for blown containers more compact.

A further object is to improve the forming conditions of a semifinished element positioned near the opening of a forming mould for forming containers.

In a first aspect of the invention, there is provided a method comprising:

forming a preform of plastic material, expanding said preform to obtain a container;

wherein said forming comprises compression-forming said preform in that mould arrangement in which said expanding occurs.

In a second aspect of the invention, there is provided a method comprising:

expanding a preform into a mould arrangement to obtain a container, wherein before said expanding, there is provided forming a dose of plastic material in a paste state in said mould arrangement to obtain said preform.

In a third aspect of the invention, there is provided an apparatus comprising:

a forming mould arrangement, a punch device for expanding a preform in said forming mould arrangement, an abutting device cooperating with said punch device, wherein said punch device and said abutting device identify a configuration in which said punch device and said abutting device cooperate to define a compression-forming unit for compression-forming a semifinished product in plastic material to obtain said preform, and a further configuration in which said punch device and said abutting device cooperate to define an expansion unit of said preform to obtain a container.

Owing to these aspects of the invention, it is possible to form containers from semifinished products located in a single forming mould. In fact, the semifinished product to be formed is placed at the opening of the mould arrangement, is then shaped to obtain a preform and this preform is then expanded without the preform having to be extracted from the mould arrangement, as on the other hand occurs in known forming systems.

Furthermore, it is possible to obtain better control of forming through the effect of the shaping of said semifinished product and the presence of abutting device that acts on the semifinished product together with the punch device on an opposite side of the latter.

Furthermore, a particularly compact forming system it is obtained.

Furthermore, the plastic material is subjected to a single heating cycle that comprises a progressive heating and cooling in several phases.

In particular, the invention enables containers to be obtained starting from a semifinished product in plastic material that may comprise an element with a thin thickness, for example a disc obtained by shearing from a film, or an injected body, or a dose of plastic material in a paste state.

In all the aforementioned cases, obtaining a preform by compression-forming from the semifinished product, enables the subsequent obtaining the container by blow-forming to be improved.

The preliminary step of obtaining a preform having a prefixed geometry, for example walls having different thickness in various points of the preforms, enables in fact a different heating phase of the preform prior to the expansion phase of the latter to be avoided.

The advantage of being able to create a preform and subsequently expand it appears particularly clear in the case of the element with a thin thickness and of the dose of plastic material in a paste state, that both could not be subjected to an expansion phase without previously be conformed as a preform.

In the case of the injected body, it is a question of an element that is structurally more similar to a preform. Nevertheless, also in this case the compression-forming of a preform from the injected body brings significant advantages.

Obtaining a preform in two phases (i.e. injection and subsequent compression-moulding) in fact enables plastic material to be used having a high molecular weight, which is very appreciated in order to facilitate operations of stretch-blow-forming.

Any defects in the injected body due, for example, to the low viscosity that is typical of plastic material with high molecular weight, can be subsequently eliminated in the compression-moulding phase, enabling containers that are free of defects to be obtained.

In particular, it is possible to use injection moulds provided with an injection opening (gate) of considerable dimensions, in order to facilitate the flow of the plastic material.

The discontinuity created in the injected body by the orientation of the injection opening is subsequently eliminated during the subsequent phase of compression-forming.

The possibility of using plastic material with a high molecular weight and of obtaining preforms substantially free of defects and having walls with a controlled thickness, enables the preforms to be subjected to blowing that acts both axially and radially, in the same mould.

The invention may be better understood and implemented with reference to the enclosed drawings that show some embodiments by way of non-limitative example, in which:

FIG. 17 is a diagram that shows a further heating cycle to which the plastic material can be subjected in a forming cycle of the apparatus.

Figure 1:
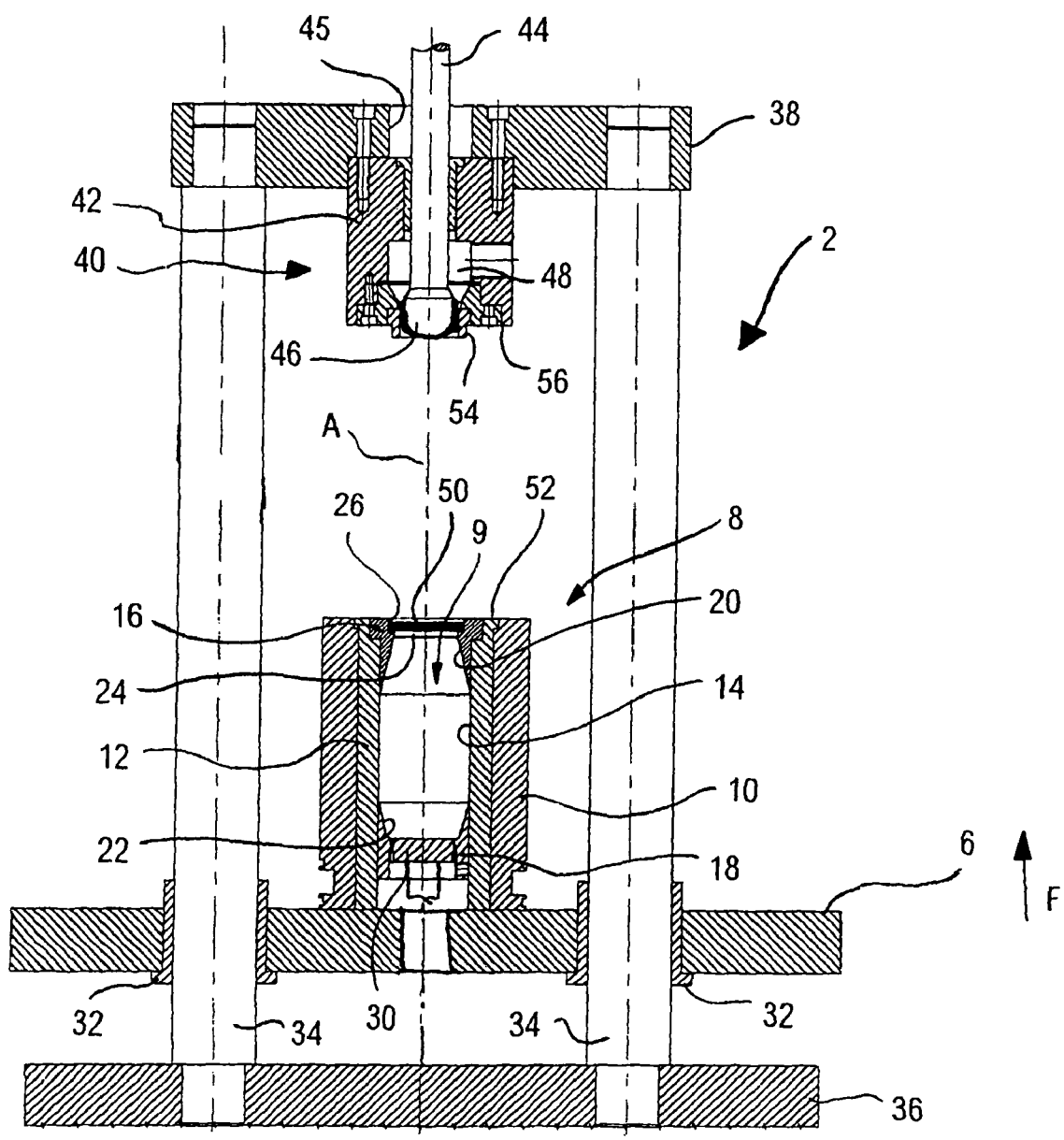
FIG. 1 is a longitudinal section of a forming apparatus, in an initial phase in which a semifinished product is supplied to a mould.

With reference to FIG. 1, a mould 2 is shown for forming a container 4 (see FIG. 6), comprising a base plate 6 on which there is fixed an external casing 10 of a die 8 that is internally provided with a cavity. Within the casing 10 there is fixed a liner 12 that defines an intermediate part 14 of the cavity 9 and carries at its opposite ends a first member 16 and a second member 18, which respectively define a first end zone 20 and a second end zone 22 of the cavity 9.

The first member 16 has an opening 24 and defines a seat 26 in which can be received a semifinished product 50 from which the container 4 is formed.

The second member 18 receives within itself a base part 30 in an axially sliding manner as will be explained in greater detail below.

The base plate 6 has a pair of bushes 32 in which respective guide rods 34 are slidingly fitted, the respective ends of which are connected by a first crosspiece 36 and by a second crosspiece 38.

The second crosspiece 38 and the first crosspiece 36 are on opposite sides of the die 8, the second crosspiece 38 supporting a punch 40 turned towards the die 8.

The punch 40 and the base part 30 are movable inside the die 8 independently of one another, in such a way as to identify a first configuration, in which the punch 40 and the base part 30 cooperate to define a forming unit for compression-forming the semifinished product 50 to obtain a preform 51, and a second configuration, in which the punch 40 and the base part 30 cooperate to define an expansion unit for the expansion of the preform 51 to obtain the container 4.

In particular, in the first configuration, the punch 40 and the base part 30 are arranged near the opening 24.

In the first configuration the base part 30 cooperates with the die 8 to define a chamber inside which the punch 40 can penetrate to press the plastic material against wall elements delimiting said chamber.

Subsequently, after the preform 51 has been formed, the base part 30 and the punch 40 are removed from the opening 24 to identify the second configuration, in which the base part 30 cooperates with the die 8 to define a further chamber inside which the punch 40 expands the preform 51 to obtain the container 4.

The punch 40 comprises a punch body 42 inside which is axially slideable a stem 44 passing through a hole 45 of the second crosspiece 38 and having a shaped head 46 turned towards the die 8.

The head 46 is housed in a chamber 48 provided in the punch body 42 into which an operating fluid, for example air at controlled pressure, can be introduced and from which it can be extracted.

In the position in FIG. 1, a disc shaped semifinished product 50 is positioned in the seat 26 at the opening 24. The semifinished product 50 is obtained by shearing from a single-layer or multilayered film.

Figure 2:
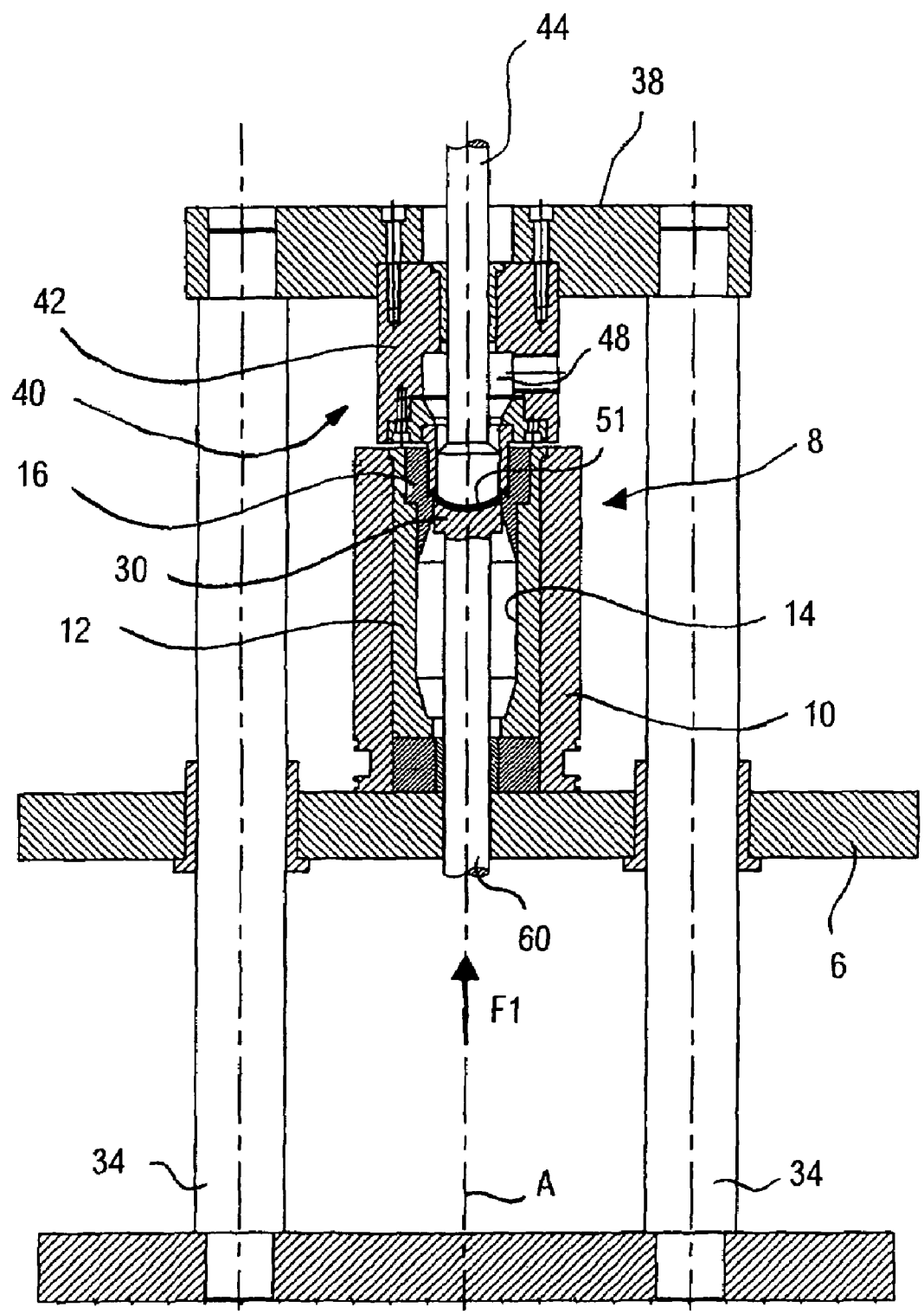
FIG. 2 is a section like the one in FIG. 1, showing a compression-forming phase of the semifinished product to obtain a preform.

The first crosspiece 36 is kept fixed and the base plate 6 is made to slide on the pair of rods 34 in the direction indicated by the arrow F to bring the first crosspiece 36 up to the punch 40, as shown in FIG. 2.

In this way, the top surface 52 of the die 8 approaches an annular front surface 56 of the punch 40 in such a way that an axial and central projection 54 of the latter penetrates inside the seat 26 and interacts with the surface of the semifinished product 50 turned towards it.

Once the projection 54 is in the interaction position disclosed above, the base part 30 is taken by an actuator 60 in the direction indicated by the arrow F1 through the cavity 9 to the opening 24 in such a way as to interact with a further surface of the semifinished product 50 opposite the surface that is in contact with the shaped head 46.

In this interaction position, a temperature control device (not shown) intervenes on the semifinished product 50 in such a way as to take it to the thermoforming temperature whereas the semifinished product 50 is shaped by the combined action of the shaped head 46 and the base part 30.

Alternatively, the semifinished product 50 can be positioned in seat 26 when it is already at the temperature at which compression-forming occurs.

Figure 3:
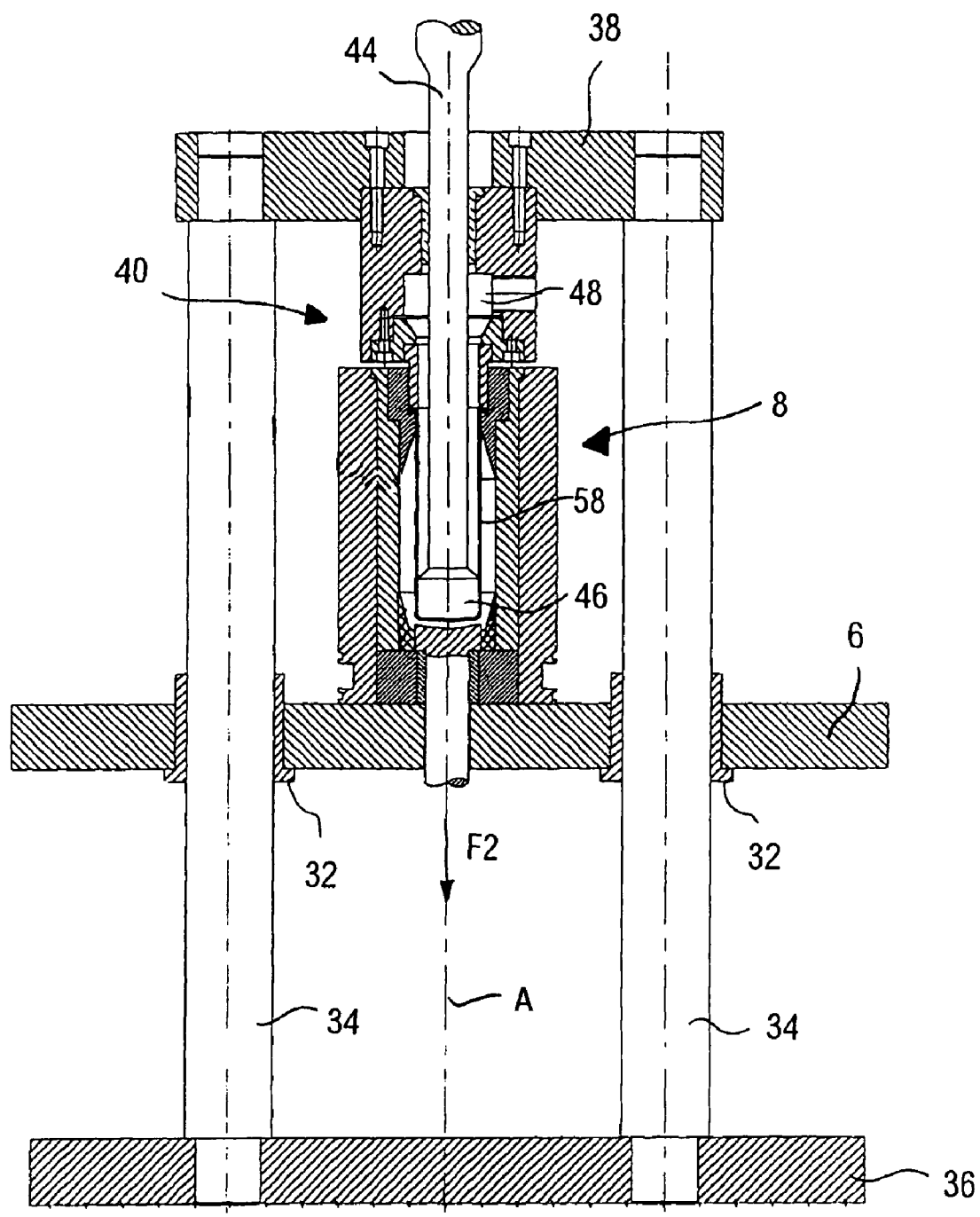
FIG. 3 is a section like the one in FIG. 1, showing a phase of stretch-forming of a precursor of a container.

Subsequently, now with reference to FIG. 3, whilst the base plate 6 is kept in the position disclosed in FIG. 2, the base part 30 is returned by the actuator 60 to its initial position in a direction F2 opposite direction F1.

Furthermore, the stem 44 shifts the shaped head 46 to the base part 30, stopping before reaching it. In this way, the semifinished product 50 has a peripheral part tightened between the projection 54 and the seat 26 and a central part that is drawn by the shaped head 46 to form a precursor 58 of a container.

Figure 4:
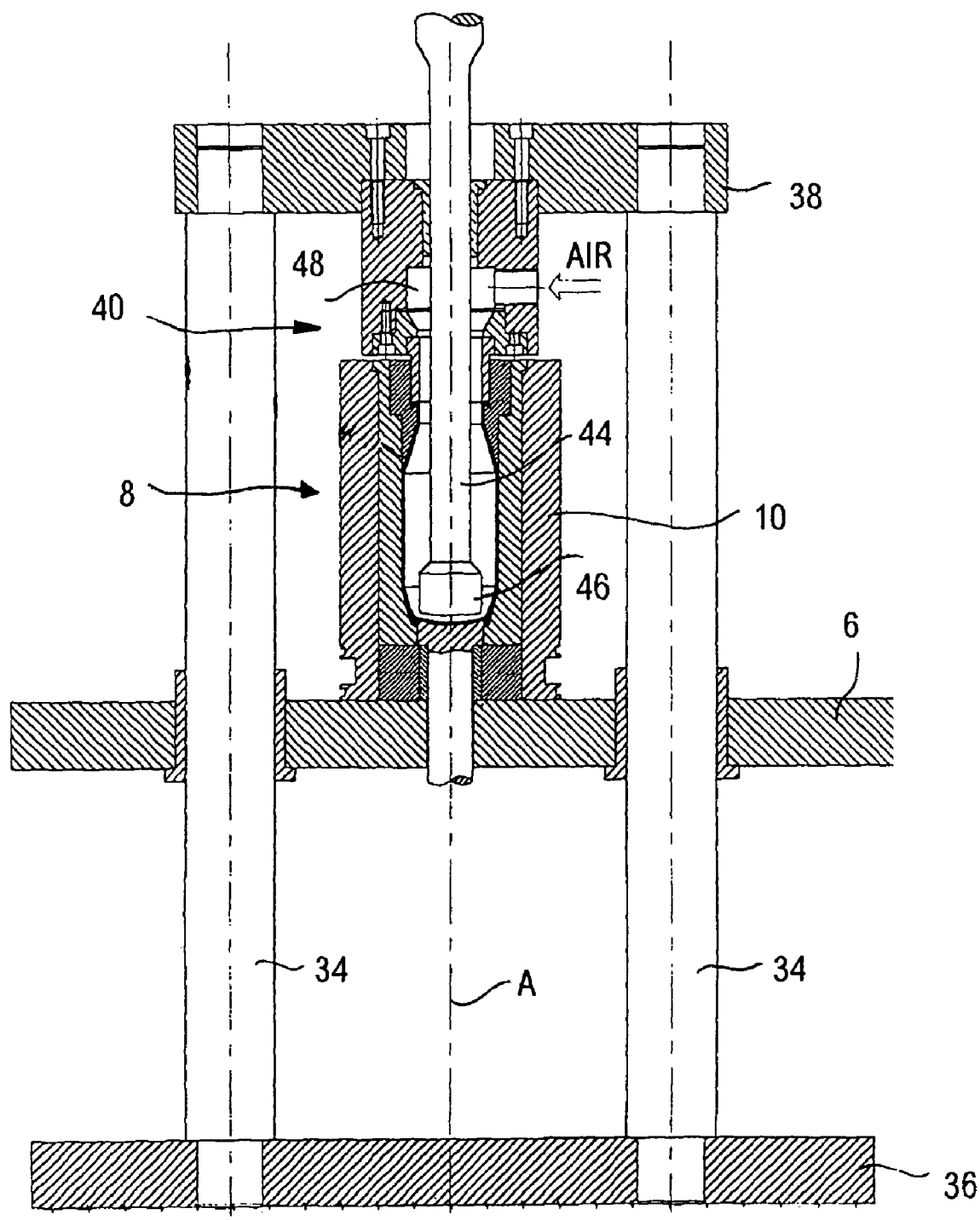
FIG. 4 is a section like the one in FIGS. 1 to 3, showing a blowing phase to form the container.

With reference to FIG. 4, compressed air is introduced into the chamber 48 that occupies the precursor 58 of a container and expands the precursor 58 until it reaches the walls that define the cavity 9.

This is made possible by the fact that the stem 44 has a transverse dimension that is smaller than that of the shaped head 46 and therefore when the shaped head 46 is outside the chamber 48, the air that is introduced into the chamber 48t can exit by the side of the head 46.

Figure 5:
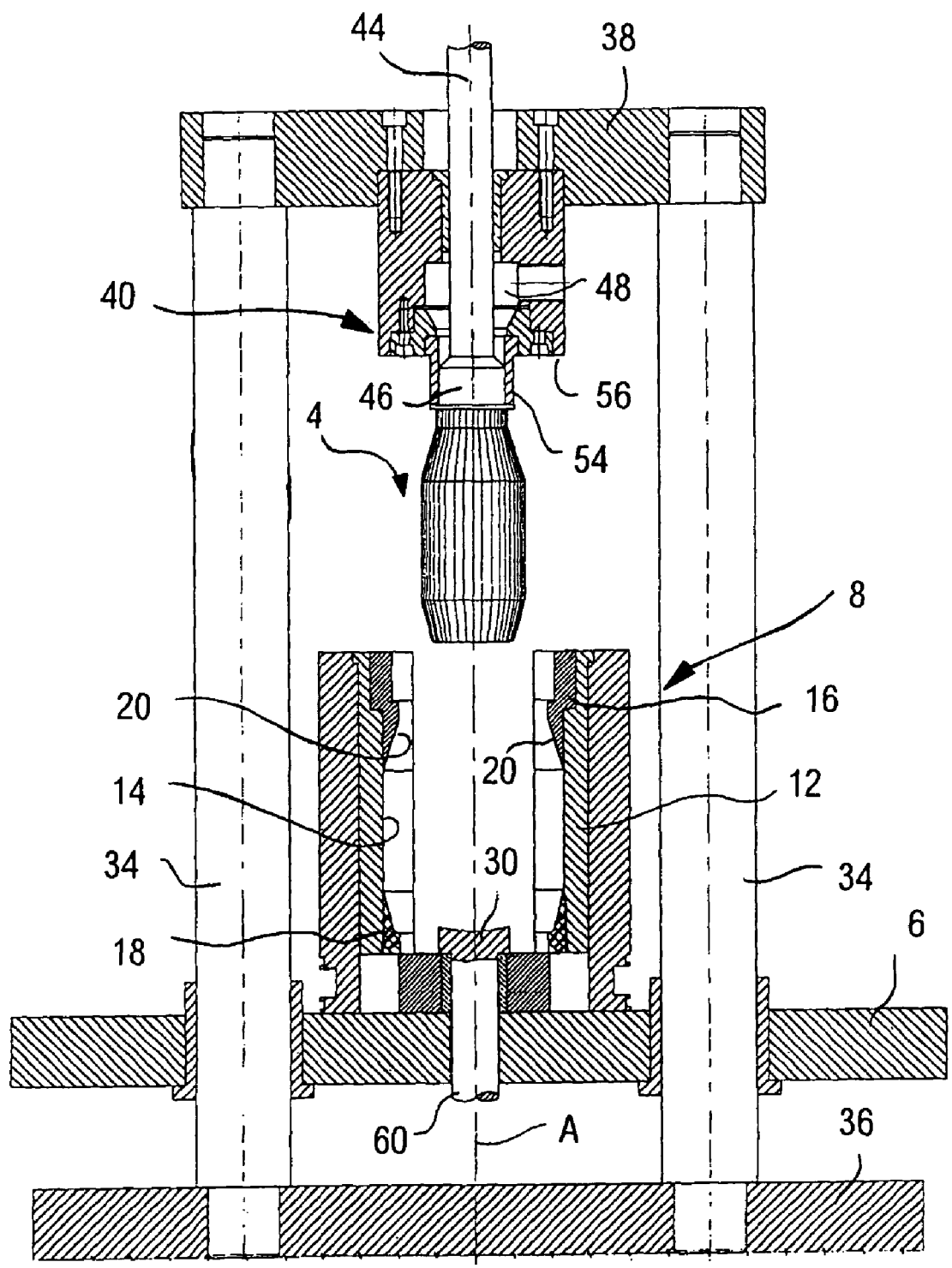
FIG. 5 is a section like the one in FIGS. 1 to 4, showing an extraction phase of a formed container.

With reference to FIG. 5, it is shown how, in order to extract the shaped container 4, it is necessary to open the die 8 by separating the casing and liner parts and the inserts that make it up.

Figure 6:
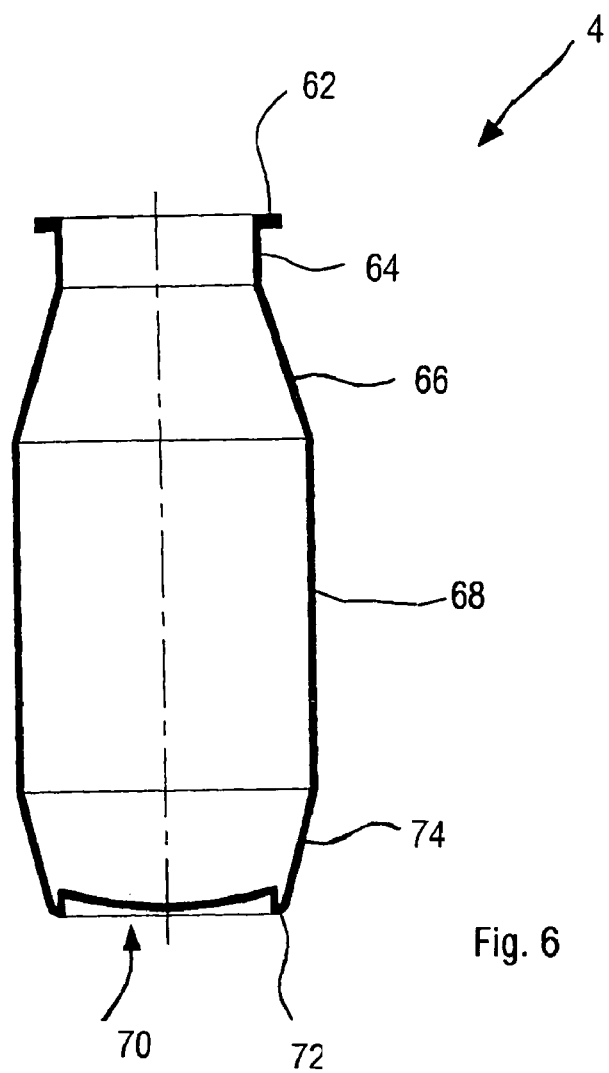
FIG. 6 is an axial section of a container.

As shown in FIG. 6, the container 4 has a flange 62 radially protruding from a neck 64 that leads away from a converging wall part 66 that is joined to a central wall part 68.

A base 70 has a peripheral support edge 72 that converge into a divergent wall 74 connected to the central wall part 68.

Figure 7:
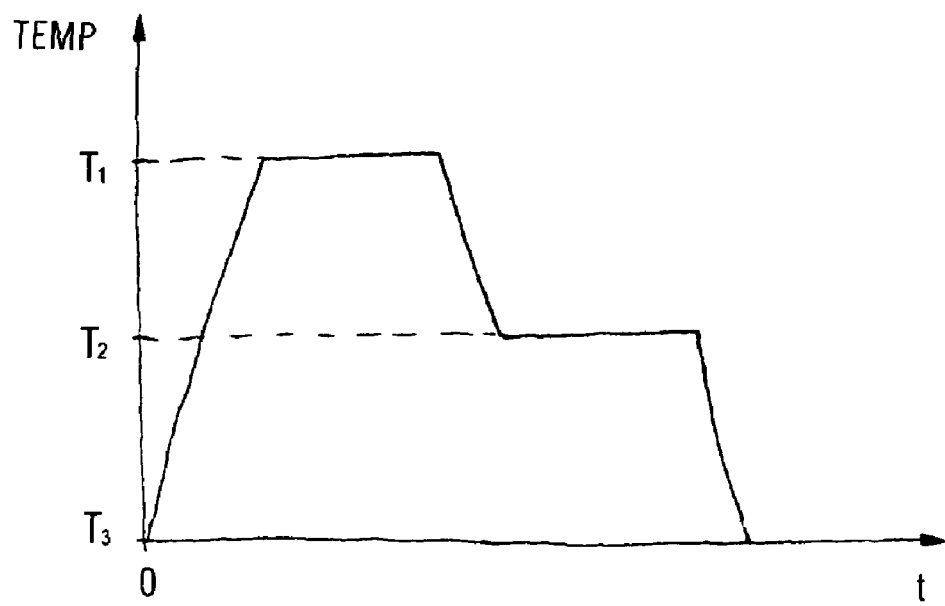
FIG. 7 is a diagram that shows a heating cycle to which the plastic material can be subjected in a forming cycle of the apparatus in FIGS. 1 to 5.

In FIG. 7 the temperature levels are shown in a forming cycle of the container 4 in the apparatus 1 of FIGS. 1 to 5.

During a first phase, the semifinished product 50 is heated to temperature $T_1$, advantageously coinciding with the plasticization temperature of the plastic material, i.e. the temperature at which compression-forming of the preform occurs. After a set period of time in which the semifinished product 50 is maintained at the temperature $T_1$, the semifinished product is cooled to the temperature $T_2$, advantageously coinciding with the forming temperature, i.e. the temperature at which stretch-blow-forming of the container occurs.

At temperature $T_2$ the preform is expanded to create a container. The container is kept at temperature $T_2$ for a certain period of time and is then progressively cooled to temperature $T_3$, coinciding for example with ambient temperature.

Figure 8:
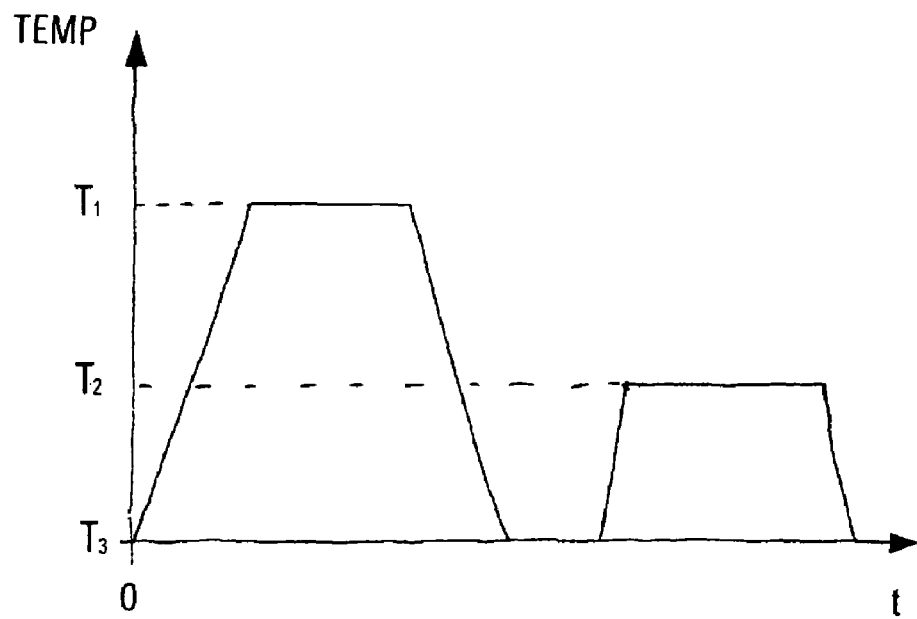
FIG. 8 is a diagram like the one in FIG. 7, but relating to the state of the art.

In the diagram in FIG. 8, in which the typical temperature levels of a system for forming containers according to the state of the art are shown, for example JP-2001 000362600, it is noted how after bringing the material to temperature $T_1$ i.e. to plasticization temperature, to obtain a preform in a first mould for forming preforms, the preform has to be cooled to temperature $T_3$, for example to ambient temperature, and be subsequently heated in a second mould for forming the containers.

Figure 9:
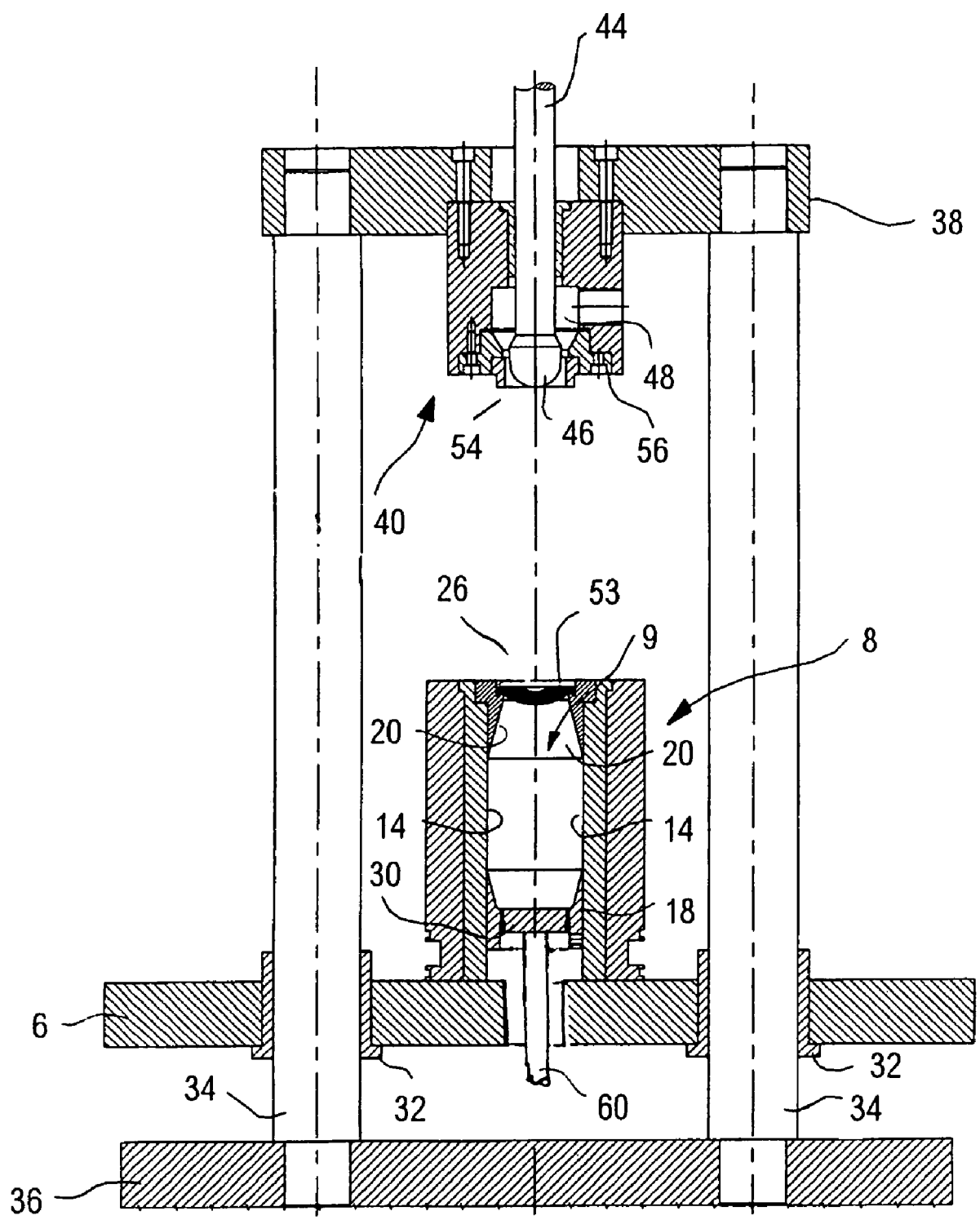
FIG. 9 is a section like the one in FIG. 1, showing an embodiment in which the mould is supplied with a semifinished product obtained by injection-forming.

As shown with reference to FIG. 9, in the seat 26 there is inserted, instead of the disc 50, a semifinished product 53 injection-formed before it is inserted into the seat 26 in a suitable mould that is not shown. The semifinished product 53 has a substantially circular shape with a central depression, but more in general, it may have any suitable shape, according to necessity, to obtain a preform 51 shown in FIG. 2, and it acts as a preliminary preform to obtain the preform 51.

Figure 10:
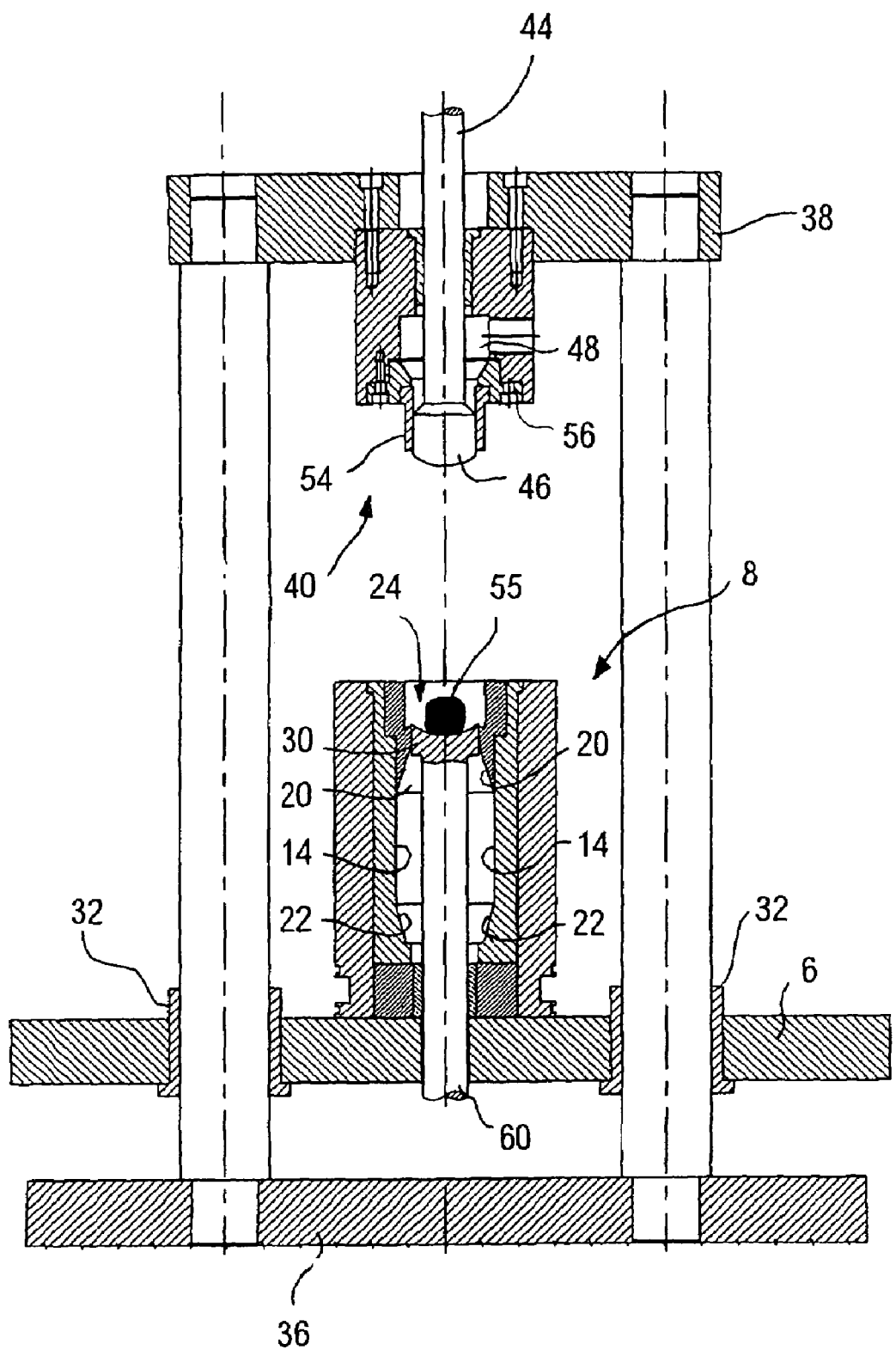
FIG. 10 is a section like the one in FIG. 1, showing an embodiment in which the mould is supplied with a dose of plastic material in a paste state.

FIG. 10 shows a variation in which instead of a disc 50, or of a preliminary preform 53, the semifinished product to be positioned near the opening 24 comprises a dose 55 of extruded plastic material in a paste state. In this embodiment, unlike what has been described with reference to FIGS. 1 to 9, the base part 30 is in a position near the opening 24 in such a way as to substantially occupy it, preventing the dose from falling into the cavity 9 in an uncontrolled manner. The dose 55 is thus released on the base part 30, when the latter is in the position shown in FIG. 10 waiting to cooperate with the punch 40 to give rise to the preform 51.

In this embodiment, the dose of plastic material, when it is positioned on the base part 30, is already at the temperature at which compression-forming of the preform 51 occurs.

For this purpose, the dose of plastic material can be extruded and subsequently cooled inside the extruder to the temperature at which compression-forming occurs.

Alternatively, two serially arranged extruders can be provided.

The apparatus embodiments in FIGS. 9 and 10 operate, in terms of forming of the preform 51, and the subsequent forming of the container 4, as already disclosed with reference to FIGS. 2 to 5.

With reference to FIG. 17, the temperature levels in a forming cycle of the container 4 are shown, the latters being different from the ones of the forming cycle in FIG. 7.

Initially, a semifinished product, such as a flat element, or an injected body, or a dose of plastic material in a paste state, is introduced into the mould 2, this semifinished product having been previously heated to a temperature $T_1$, at which temperature the semifinished product is compression-formed to create a preform 51.

Subsequently, the semifinished product is kept at a temperature $T_1'$, at least during the compression-forming phase.

Thereafter, the perform 51 thereby obtained is expanded to create a container 4.

Expansion of the preform occurs at a temperature $T_2'$ that is lower than the temperature $T_1'$, the difference between the temperature $T_1'$ and $T_2'$ being rather limited. In other words, the temperature $T_1'$ and $T_2'$ are near to each other.

In a further heating cycle, which is not shown, the temperature at which expansion of the preform occurs substantially coincides with the temperature at which the preform was compression-formed.

A small or possibly non-existent difference between the temperature at which expansion of the preform occurs and the temperature at which the preform was compression-formed enables a more uniform distribution of the temperature to be obtained in the thickness of the preform, and therefore enables stretch-blow-forming to be optimised.

The container obtained is subsequently cooled to a temperature $T_3'$.

Figure 11:
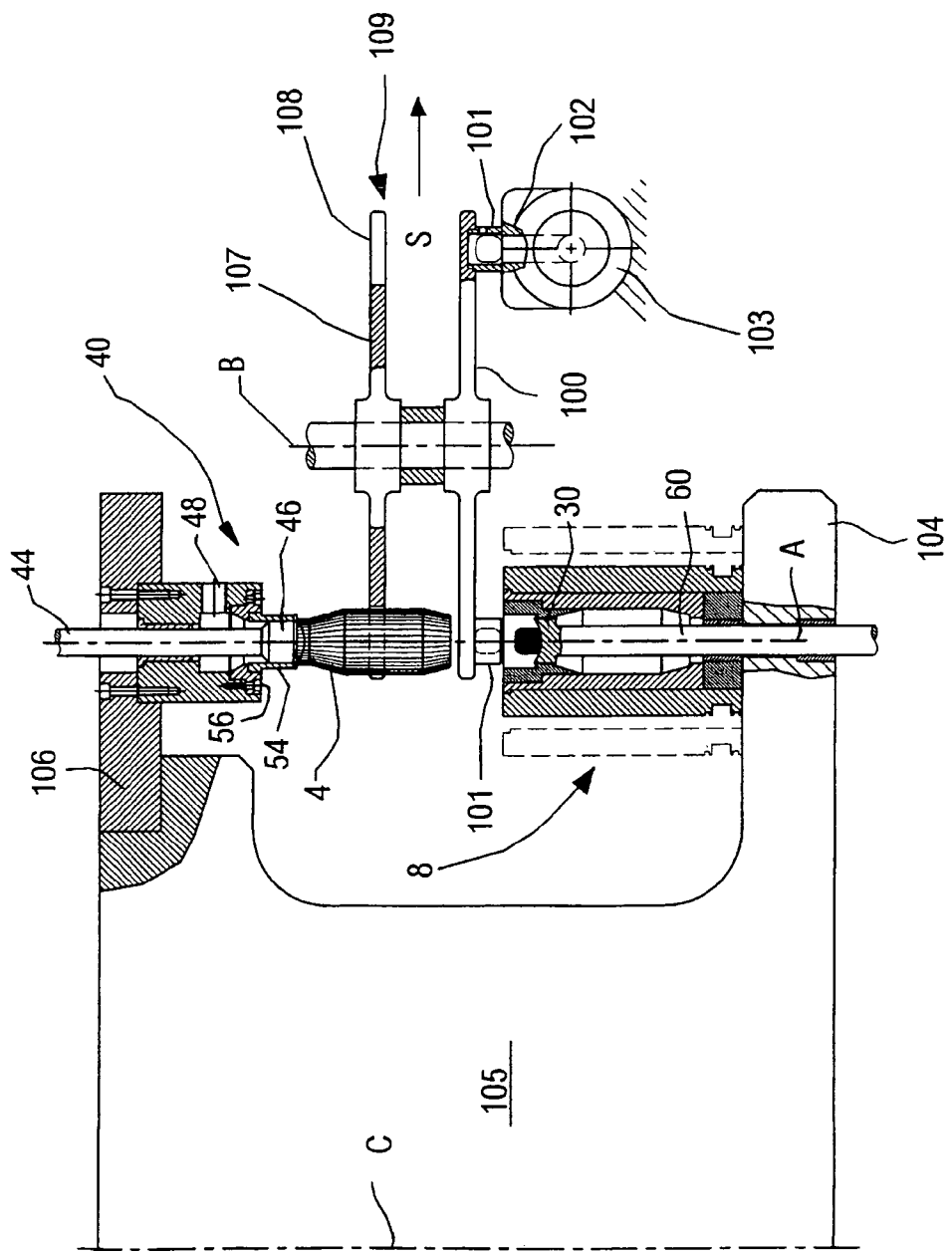
FIG. 11 is a section like the one in FIG. 10, showing an embodiment in which the dose of plastic material is inserted into a mould comprised in a rotating machine.

As shown in FIG. 11, a forming apparatus similar to the one disclosed with reference to FIGS. 1 to 10 can also be fitted onto a rotating machine.

In the particular case in which forming of the container occurs starting from a dose 55 of plastic material in a paste state, it is provided for that the dose is conveyed above the opening 24 occupied by the base part 30 by a turntable 100 that is made to rotate around an axis B parallel to the longitudinal axis A. In a peripheral zone of the turntable 100 spoons 101 are supported by a side of the table, which spoons 101 pick up a dose 55 from an outlet 102 of an extruder 103 and deposit it on the base part 30 in a raised position.

The base part 30 is a component of the cavity 8 fitted to a bottom part 104 of a carousel 105 that is rotatable around a main axis C of the machine. The bottom part 104 can thus be provided with a plurality of cavities distributed along its periphery. The carousel 105 is provided with a top part 106 fitted with a corresponding plurality of punches superimposed on the cavities 8.

On the turntable 100 a star 107 is fitted that is provided with arms 108 between which gaps 109 are defined between which the formed containers 4 are received singly that are released by the respective punches 40.

The containers 4 are picked up by the punches 40 by means of the star 107 and are transferred by the arms 108 to an unloading zone S whilst they rest on the turntable 100.

In one version, that is not shown, a plurality of apparatuses 1 can be provided that are fitted to form a set of pressing units arranged in line.

Figures 12, 13:
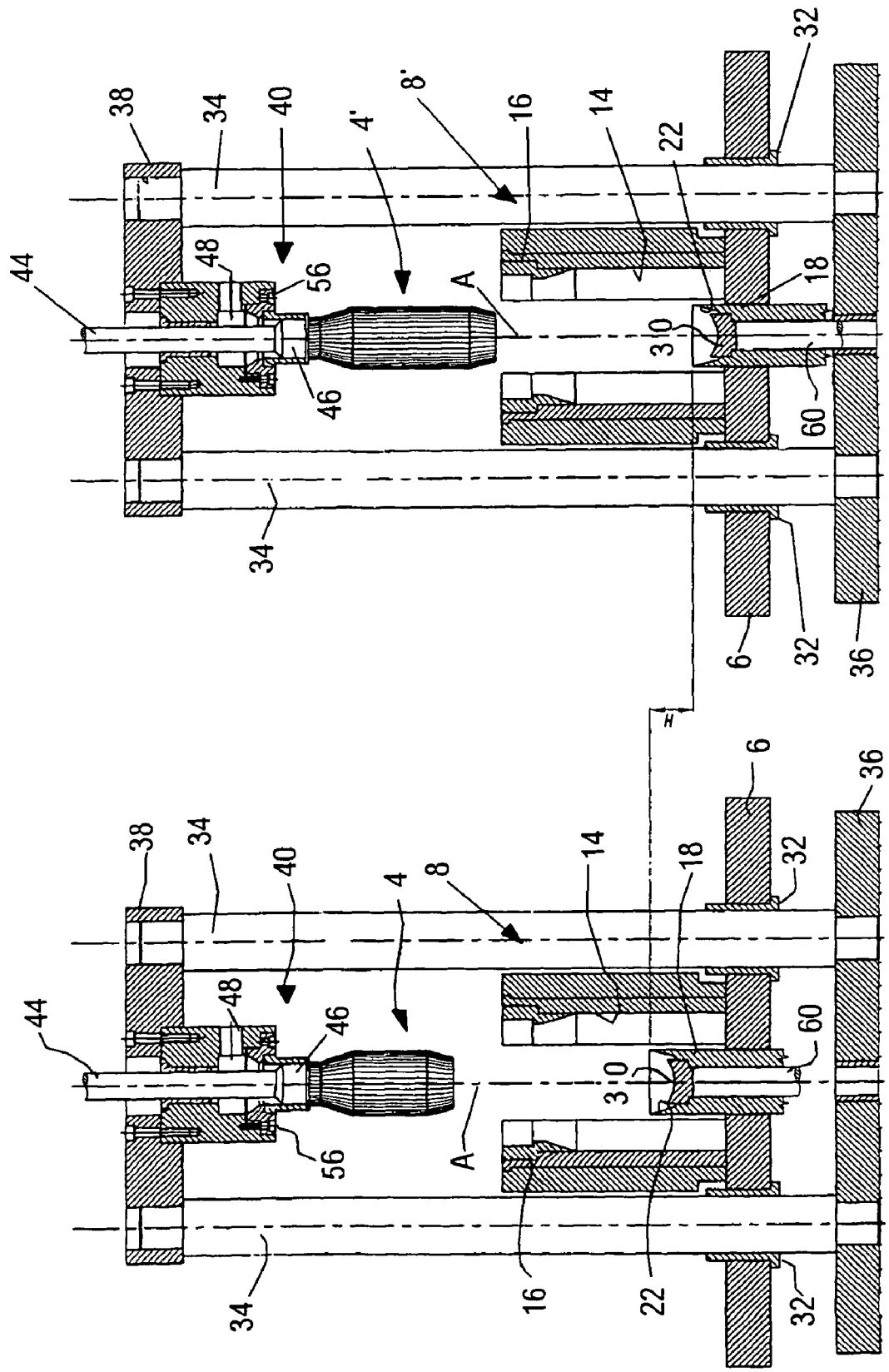
FIG. 12 is a section like the one in FIG. 1, showing a mould configuration suitable for obtaining a first container format.
FIG. 13 is a section like the one in FIG. 12, showing a further mould configuration suitable for obtaining a second container format.

From the comparison between FIGS. 12 and 13, it is possible to provide that the base part 30 can be positioned at variable distances from the top of the cavity 8. In this way, it is possible to use the same cavity 8 to obtain different formats of containers 4, 4' by simply arranging the base part 30 at different distances from the top of the cavity 8. In particular, it is shown how the different arrangement of the base part can provide containers that differ from one another by a preset height H.

In such cases, the intermediate part 14 could have a cylindrical form with constant cross-section that extends at least for a portion that occupies the possible different positions that the base part 30 can take up.

The head 46 and/or the base part 30 may be made of several parts arranged concentrically in relation to one another, in such a way as to make possible to form preforms 51, or containers 4, having the most widely varying geometries. For this purpose, the parts that form the head 46 and/or the base part 30 are slideable in relation to one another and can be independently powered.

Figure 14:
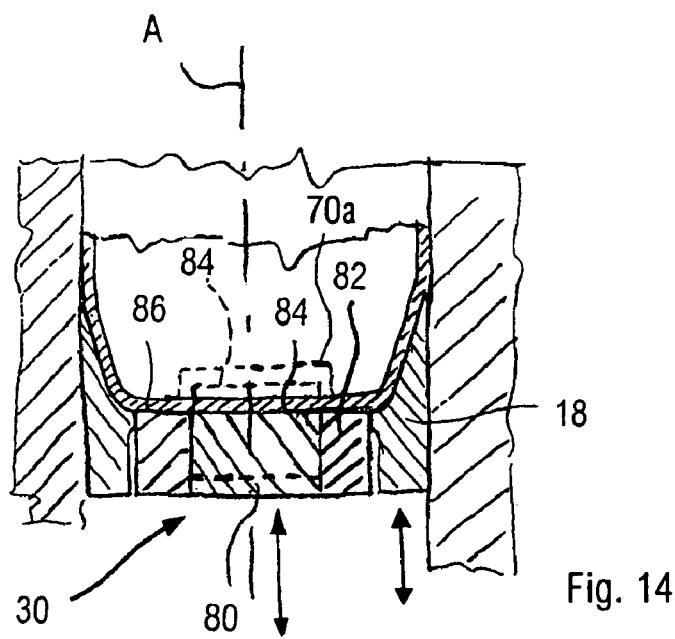
FIG. 14 is a longitudinal, fragmentary and enlarged section of a base part of the mould in FIG. 1, showing a version of the base part.

With reference to FIG. 14, it is shown how the base part 30 may comprise a central portion 80 surrounded by a peripheral portion 82 that may slide axially along a longitudinal axis A of the mould 2 in relation to the central portion 80. In this way, the central portion 80 can for example be positioned either in such a way that its internal surface 84 is substantially coplanar with an internal peripheral surface 86 of the peripheral portion 82 to form a substantially flat container base.

Alternatively, as shown by the broken line, the internal surface 84 can be shifted further to the inside of the cavity 9 in such a way as to form a container base that has a central zone 70a that is raised in relation to the peripheral edge 72.

Figure 15:
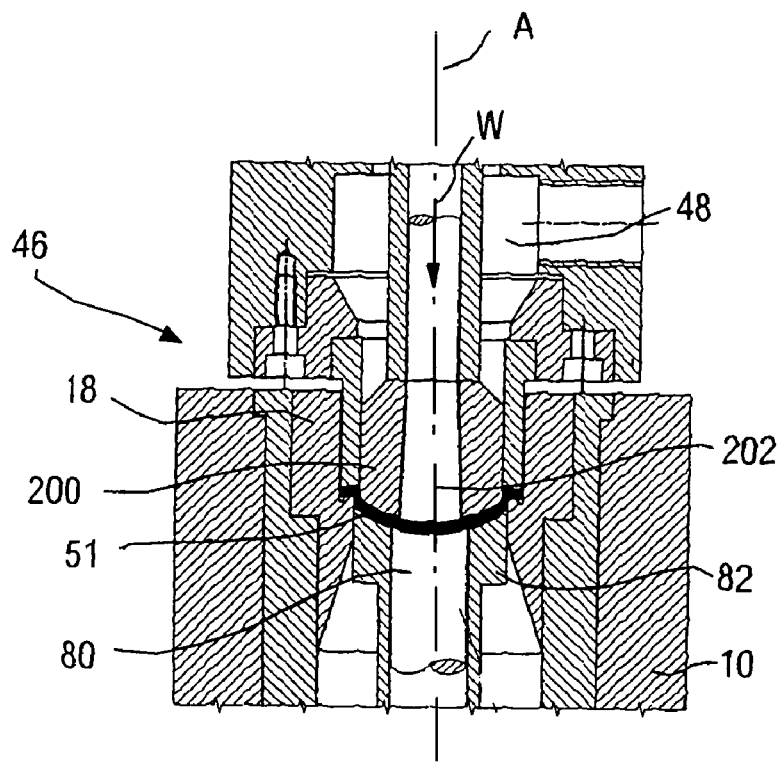
FIG. 15 is a section like the one in FIG. 14, showing a punch body subdivided into coaxial parts.
Figure 16:
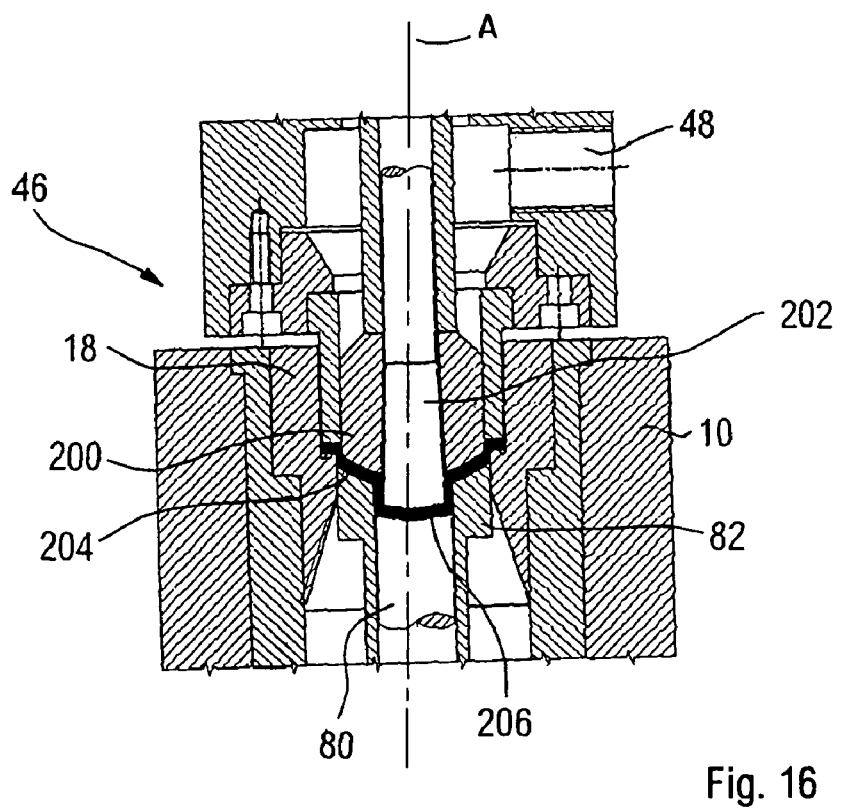
FIG. 16 is a section like the one in FIG. 15, showing the body of the punch in an operating configuration that is different from the one shown in FIG. 15.

With reference to FIG. 15, it is shown how the shaped head 46 comprises an external annular part 200 and an internal annular part 202, both of which are driven independently in a direction W parallel to the axis A. In this way it is possible to move the internal part 202 and the external part 200, as well as the central portion 80 and the peripheral portion 82, in such a way as to enable a preform 51 to be obtained as shown in FIG. 2. In particular, the central portion 80 faces the internal part 202 and substantially has a transverse dimension that is larger than that of the latter. In this way it is possible, as shown in FIG. 16, for the internal part 202 to penetrate inside the peripheral portion 82 in such a way as to give rise to a central projection 206 in a preform 204.

The invention claimed is:

1. Method comprising:
   expanding a preform in a mould arrangement to obtain a container,
   wherein before said expanding, compression-forming an extruded dose of plastic material in a paste state in said mould arrangement to obtain said preform is provided for,
   wherein said compression-forming occurs near an opening of said mould arrangement,
   wherein said compression-forming comprises tightening said dose between a punch device and an abutting device that is part of a die arrangement of said mould arrangement, said punch device and said abutting device being arranged near said opening, and
   wherein after said forming, removing said abutting device from said opening is provided for.

2. Method according to claim 1, wherein before said forming, arranging said abutting device near said opening to receive said dose is provided for.

3. Method according to claim 1, wherein said removing comprises shifting said abutting device until it is defined part of a cavity of said die arrangement situated on the opposite side of said cavity in relation to said opening.

4. Method according to claim 1, wherein said expanding comprises introducing a shaped head of said punch device through said opening towards said abutting device.

5. Method according to claim 1, wherein said expanding comprises introducing a forming fluid through said punch device.

6. Method according to claim 1, wherein said abutting device is shaped in such a way as to cooperate to form a base of a container.

7. Method according to claim 3, wherein said abutting device is positioned at different distances from the top of said die arrangement to form containers having formats that are correspondingly different from one another.

8. Method according to claim 1, wherein said compression-forming occurs at the plasticization temperature of said plastic material.

9. Method according to claim 1, wherein the temperature at which compression-forming occurs is near the temperature at which stretch-blow-forming occurs.

10. Apparatus comprising:
    a forming mould arrangement,
    a punch device for expanding a preform in said mould arrangement,
    an abutting device cooperating with said punch device,
    wherein said punch device and said abutting device identify a configuration in which said punch device and said abutting device cooperate to define a compression-forming unit for compression-forming an extruded dose of plastic material in a paste state to obtain said perform, wherein, in said configuration, said abutting device cooperates with a die arrangement of said mould arrangement to define a cavity device inside which said extruded dose of plastic material is released and inside which said punch device can penetrate to compression-form said plastic material against said abutting device and against a wall element internally delimiting said cavity device; and wherein said punch device and said abutting device identify a further configuration in which said punch device and said abutting device cooperate to define an expansion unit of said preform to obtain a container, wherein said die arrangement comprises an opening, said punch device and said abutting device defining said forming unit for compression-forming at said opening and wherein said punch device comprises a shaped head having a transverse dimension less than said opening, said shaped head being subdivided into parts made to slide in a further preset direction.

11. Apparatus according to claim 10, wherein, in said further configuration, said abutting device cooperates with said die arrangement to define a further cavity device inside which said punch device can penetrate to expand said preform.

12. Apparatus according to claim 10, wherein said abutting device defines a part of said cavity device, or of said further cavity device, located on the side opposite said cavity device, or of said further cavity device, in relation to said opening.

13. Apparatus according to claim 10, wherein said abutting device is shaped in such a way as to receive said semifinished product on it near said opening.

14. Apparatus according to claim 10, wherein said abutting device is shaped in such a way as to cooperate to form a base of a container.

15. Apparatus according to claim 10, wherein said abutting device is subdivided into portions made to slide in a preset direction.

16. Apparatus according to claim 15, wherein said preset direction passes through a longitudinal axis of said mould arrangement.

17. Apparatus according to claim 15, wherein said portions comprise a peripheral portion coaxially arranged around a central portion.

18. Apparatus according to claim 10, wherein said further preset direction passes through a longitudinal axis of said mould arrangement.

19. Apparatus according to claim 10, wherein said parts comprise an external part coaxially arranged around an internal part.

20. Apparatus according to claim 17, wherein said parts comprise an external part coaxially arranged around an internal part.

21. Apparatus according to claim 20, wherein said internal part and said peripheral portion are shaped in such a way that said internal part is receivable in said peripheral portion.

22. Apparatus according to claim 10, wherein said punch arrangement comprises a passage element of a forming fluid.

23. A rotating forming machine comprising at least an apparatus according to claim 10.

24. Apparatus comprising:
a forming mould arrangement,
a punch device for expanding a preform in said mould arrangement,
an abutting device cooperating with said punch device, wherein said punch device and said abutting device identify a configuration in which said punch device and said abutting device cooperate to define a compression-forming unit for compression-forming an extruded dose of plastic material in a paste state to obtain said perform, wherein, in said configuration, said abutting device cooperates with a die arrangement of said mould arrangement to define a cavity device inside which said extruded dose of plastic material is released and inside which said punch device can penetrate to compression-form said plastic material against said abutting device and against a wall element internally delimiting said cavity device; and
wherein said punch device and said abutting device identify a further configuration in which said punch device and said abutting device cooperate to define an expansion unit of said preform to obtain a container, wherein said die arrangement comprises an opening,
wherein said punch device comprises a shaped head, said shaped head being subdivided into parts made to slide in a further preset direction.

25. Apparatus according to claim 24, wherein said further preset direction passes through a longitudinal axis of said mould arrangement.

26. Apparatus according to claim 24, wherein said parts comprise an external part coaxially arranged around an internal part.

27. Apparatus comprising:
a forming mould arrangement,
a punch device for expanding a preform in said mould arrangement,
an abutting device cooperating with said punch device,
wherein said punch device and said abutting device identify a configuration in which said punch device and said abutting device cooperate to define a compression-forming unit for compression-forming an extruded dose of plastic material in a paste state to obtain said perform, wherein, in said configuration, said abutting device cooperates with a die arrangement of said mould arrangement to define a cavity device inside which said extruded dose of plastic material is released and inside which said punch device can penetrate to compression-form said plastic material against said abutting device and against a wall element internally delimiting said cavity device; and wherein said punch device and said abutting device identify a further configuration in which said punch device and said abutting device cooperate to define an expansion unit of said preform to obtain a container,
wherein said shaped head is subdivided into parts made to slide in a further preset direction;
wherein said portions comprise a peripheral portion coaxially arranged around a central portion; and
wherein said abutting device is subdivided into portions made to slide in a preset direction.

28. Apparatus according to claim 27, wherein said further preset direction passes through a longitudinal axis of said mould arrangement.

29. Apparatus according to claim 27, wherein said parts comprise an external part coaxially arranged around an internal part.

30. Apparatus according to claim 29, wherein said internal part and said peripheral portion are shaped in such a way that said internal part is receivable in said peripheral portion.

* * * * *